United States Patent [19]

Matzner et al.

[11] Patent Number: 4,536,543

[45] Date of Patent: Aug. 20, 1985

[54] COPOLYMERS OF POLYPHENYLENE OXIDES AND POLY(ARYL ETHER)S

[75] Inventors: Markus Matzner, Edison, N.J.; Donald M. Papuga, Danbury, Conn.

[73] Assignee: Union Carbide Corporation, Danbury, Conn.

[21] Appl. No.: 537,849

[22] Filed: Sep. 30, 1983

[51] Int. Cl.$^3$ .............................................. C08L 61/04
[52] U.S. Cl. ......................................... 525/68; 525/88; 525/132; 525/150; 525/151; 525/153; 525/390; 525/905
[58] Field of Search ................... 525/68, 92, 132, 390, 525/905, 88, 150, 153, 151

[56] References Cited

U.S. PATENT DOCUMENTS

| 3,703,564 | 11/1972 | White | 525/905 |
| 4,129,555 | 12/1978 | White | 525/905 |
| 4,175,175 | 11/1979 | Johnson et al. | 528/219 |
| 4,334,050 | 6/1982 | White | 525/390 |

Primary Examiner—Jacob Ziegler
Attorney, Agent, or Firm—Donald M. Papuga

[57] ABSTRACT

Described are novel copolymers of polyphenylene oxides and poly(aryl ether)s. These copolymers are readily compatible with styrene polymers and copolymers and give tough blends.

8 Claims, No Drawings

COPOLYMERS OF POLYPHENYLENE OXIDES AND POLY(ARYL ETHER)S

BACKGROUND OF THE INVENTION

Described herein are novel copolymers of polyphenylene oxides and poly(aryl ether)s. These copolymers are readily compatible with styrene polymers and copolymers and give tough blends.

Poly(aryl ether) polymers, particularly polysulfone, are tough, rigid, high strength thermoplastic materials which maintain their properties over a wide temperature range of from −150° F. to above 300° F. They have a continuous use temperature of about 300° F. They are hydrolytically stable and have excellent mechanical, electrical and chemical properties which allows them to be molded into a variety of articles.

Poly(aryl ether) polymers are compatible with a wide variety of other polymer systems. However, poly(aryl ether) polymers have only marginal mechanical compatibility with styrene polymers. This marginal compatibility is manifested in poor weld-line strength as well as poor surface appearance of articles injection molded from such blends.

Thus, there is a desire to make poly(aryl ether) polymers compatible with styrene polymers and copolymers.

THE INVENTION

It has now been found that by first forming a copolymer of polyphenylene oxide and poly(aryl ether), the resulting copolymers are compatible with styrene based polymers and copolymers.

In one embodiment, the novel copolymers of this invention are prepared by a process which involves first forming a quinone-coupled polyphenylene oxide. The quinone-coupled polyphenylene oxide is prepared by well-known prior art methods such as those described in, for example, U.S. Pat. No. 4,140,675.

Broadly, the quinone-coupled polyphenylene oxides can be prepared by reacting polyphenylene oxides containing quinones under reaction conditions, e.g., time, temperature and pressure, which facilitate reaction of at least a portion, and preferably substantially all of any quinone species of polyphenylene oxides, subject to the proviso that the reaction is carried out in a reaction medium substantially free of (1) any monophenol reactant and (2) any active oxidative coupling catalyst system known to those skilled in the art which promotes self-condensation of monophenols to from polyphenylene oxides.

Accordingly, any prior art quinone containing polyphenylene oxide reaction product can be employed including those described in, for example, U.S. Pat. Nos. 3,306,879; 3,914,266; 3,972,851 and 3,965,069, subject to the proviso that the reaction products be separated from substantially all of the active catalyst system as well as substantially all of any unreacted phenol prior to reacting the quinone with the polyphenylene oxide. Separation of the active catalyst system from the prepared prior art polyphenylene oxides can be carried out by any means, e.g., by purging oxygen from the reaction medium via inert gas displacement by argon, nitrogen, etc., whereby substantially all of the oxygen or air employed in the oxidative coupling process is separated from the polymer; by centrifuging the reaction products whereby substantially all of any copper or manganese component of the active catalyst system and/or any unreacted monophenol contained within the aqueous phase reaction products is separated from the organic phase which comprises substantially all of the polyphenylene oxide and quinone plus minor amounts of any primary, secondary or tertiary amines employed in the prior art catalytic processes.

As stated hereinbefore, any reaction temperature can be employed for the coupling. Preferably, temperatures of from 0° to 100° C. are used.

Any prior art polyphenylene oxide can be employed, regardless of intrinsic viscosity or the amount of quinone contained within the polyphenylene oxide charged to the reaction medium which polyphenylene oxide is prepared according to any of the prior art methods. Illustrative of prior art, etc., polyphenylene oxides that can be employed are those of the formula:

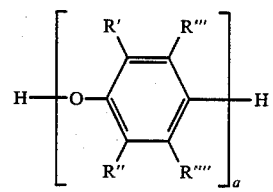

wherein a is at least equal to 1 and is preferably 40 to 500, the R's are hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus. The substituents can be the same or different.

The product is a quinone-coupled polyphenylene oxide having an average hydroxyl group per molecule value greater than the average hydroxyl group value associated with the starting polyphenylene oxide reactant.

Broadly, the quinone-coupled polyphenylene oxides can be illustrated by the formula

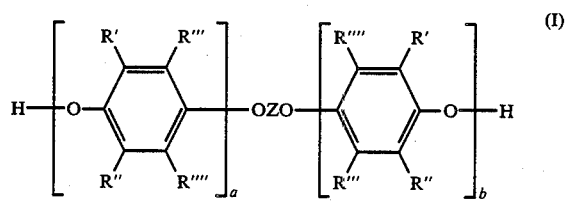

wherein independently each —OZO— is a divalent quinone residue, Z is a divalent arylene radical, a and b are at least equal to 1, the sum of a plus b is at least equal to 10, preferably to 40 to 500, the R's are as heretofore defined. Preferred quinone-coupled polyphenylene oxide products are of formula (I) above wherein independently each R', R'', R''', and R'''' is hydrogen, a hydrocarbon radical, a halohydrocarbon radical, and even more preferably where R' and R'' are methyl radical, R''' and R'''' being hydrogen atoms.

In a second embodiment, mono-functional polyphenylene oxides of the following general formula (II) can be used:

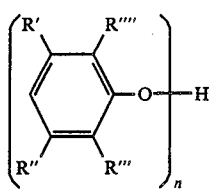

the R's are independently as defined above and n is integer of at least 10, preferably from 40 to 500.

The poly(aryl ether) polymer may be described as a linear, thermoplastic polyarylene polyether wherein the arylene units are interspersed with either ether, sulfone or ketone linkages. These resins may be obtained by reaction of an alkali metal double salt of a dihydric phenol and a dihalobenzenoid or dinitrobenzenoid compound, either or both of which contain a sulfone or a ketone linkage, i.e., —SO$_2$— or —CO—, between arylene groupings, to provide sulfone or ketone units in the polymer chain in addition to arylene units and ether units. The polymer has a basic structure comprising recurring units of the formula: O—E—O—E' wherein E is the residuum of the dihydric phenol, and E' is the residuum of the benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyether resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxyphenyl)-2-phenyl ethane bis(4-hydroxyphenyl)methane, or their chlorinated derivatives containing one or two chlorines on each aromatic ring. Other materials also termed appropriately "bisphenols" are also highly valuable and preferred. These materials are the bisphenols of a symmetrical or unsymmetrical joining group, the latter for example, being an ether oxygen (—O—), carbonyl

sulfone

or a hydrocarbon residue in which the two phenolic nuclei are joined to the same or different carbon atoms of the residue.

Such dinuclear phenols can be characterized as having the structure:

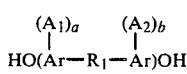

wherein Ar is an aromatic group and preferably is a phenylene group, A$_1$ and A$_2$ can be the same or different inert substituent groups such as alkyl groups having from 1 to 4 carbons atoms, halogen atoms, i.e., fluorine, chlorine, bromine or iodine, or alkoxy radicals having from 1 to 4 carbon atoms, a and b are integers having a value of from 0 to 4, inclusive, and R$_1$ is representative of a bond between aromatic carbon atoms as in a dihydroxyl-diphenyl, such as 4,4',3,3' or 4,3'-dihydroxydiphenyl; or is a divalent radical, including, for example, radicals such as

—O—, —S—, —SO—, —S—S—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals or an aromatic radical; it may also represent rings fused to both Ar groups Examples of specific dihydric polynuclear phenols include among others the bis-(hydroxyphenyl)alkanes such as
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3-hexafluoropropane, and the like;
di(hydroxyphenyl)sulfones such as
bis-(4-hydroxyphenyl sulfone).
2,4'-dihydroxydiphenyl sulfone,
5-chloro-2,4'-dihydroxydiphenyl sulfone,
5'-chloro-4,4'-dihydroxydiphenyl sulfone, and the like;
di(hydroxyphenyl)ethers such as
bis-(4-hydroxyphenyl)ether, the 4,3'-,4,2'-2,2'-2,3-,dihydroxyphenyl ethers,
4,4'-dihydroxy-2,6-dimethyldiphenyl ether, bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxy-3,6-dimethoxydiphenyl ether.

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through an aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid ring or polynuclear where they are attached to different benzenoid rings, provided there is an activating electron withdrawing group in the ortho or para position of that benzenoid ring. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group is employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reaction rate and hence are preferred. It is further preferred that the ring contain no electron supplying groups on the same benzenoid nucleus as the halogen or nitro group; however, the presence of other groups on the nucleus or in the residuum of the compound can be tolerated. Preferably, all of the substituents on the benzenoid nucleus are either hydrogen (zero electron withdrawing), or other groups having a positive sigma value, as set forth in J. F. Bunnett in Chem. Rev. 49,273 (1951) and Quart. Rev., 12, 1 (1958). See also Taft, Steric Effects in *Organic Chemistry*, John Wiley & Sons (1956), chapter 13; *Chem. Rev.*, 53, 222; JACS, 74,3120; and JACS, 75, 4231.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group

the carbonyl group

the vinylene group

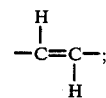

the sulfoxide group

the azo group —N=N—; the saturated fluorocarbon groups —CF$_2$CF$_2$—; organic phosphine oxides

where R$_2$ is a hydrocarbon group, and the ethylidene group

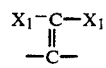

where X$_1$ can be hydrogen or halogen, and activating groups within the nucleus which can activate halogens or nitro functions on the same or adjacent ring such as in the case with difluorobenzoquinone, 1,4- or 1,5- or 1,8-difluoroanthraquinone, etc.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt by the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

The polymerization reaction proceeds in the liquid phase of a sulfoxide or sulfone organic solvent at elevated temperatures. In order to obtain the high polymers, the system should be substantially anhydrous, and preferably with less than 0.5 percent by weight water in the reaction mixtures.

In another embodiment, the poly(aryl ethers) may be prepared by the high temperature condensation of the diphenol with the dihalo or dinitro aromatic compound in an inert aprotic solvent in the presence of at least equimolar amounts of an alkali or alkaline earth metal carbonate or bicarbonate. Preferably, mixtures of potassium carbonate with sodium carbonate are used. N-methylpyrrolidone, dimethyl sulfoxide, sulfolane, N,N-dimethylacetamide and diphenyl sulfone are preferred solvents.

A preferred form of the polyarylene polyethers of this invention are those prepared using the dihydric polynuclear phenols of the following types, including the derivatives thereof which are substituted with inert substituent groups on the aromatic nuclei:

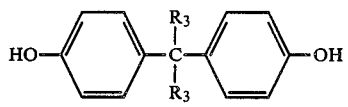

in which the $R_3$ group represents independently hydrogen, lower alkyl, aryl and the halogen substituted groups thereof, which can be the same or different; the compound with $R_3$=$CH_3$ is preferred:

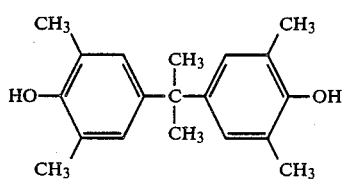

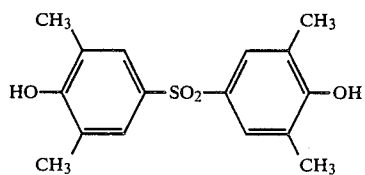

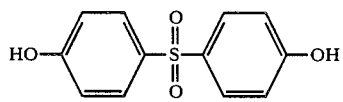

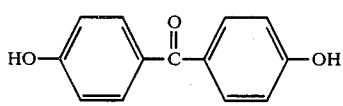

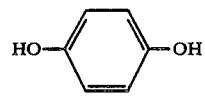

and nuclearly substituted derivatives thereof.

It is also contemplated in this invention to use a mixture of two or more different dihydric phenols to accomplish the same ends as above. Thus when referred to above the —E— residuum in the polymer structure can actually be the same or different aromatic residua.

The preferred poly(aryl ether)s have repeating units of the formula:

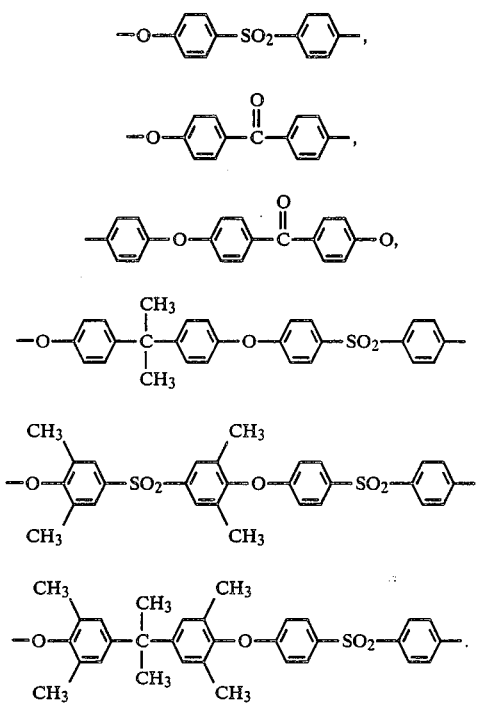

The styrenic polymers, (i.e., copolymers, terpolymers, etc.) suitable for use herein include styrene/acrylonitrile copolymers, especially ABS type polymers, the molecules of which contain two or more polymeric parts of different compositions that are bonded chemically. The ABS type polymers are preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

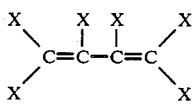

wherein X may be hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3,-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated dienes are butadiene or isoprene One monomer or group of monomers that may be polymerized in the presence of the prepolymerized backbone are the styrenes, such as: styrene, 3-methylstyrene; 3,5-diethylstyrene, 4-n-propylstyrene, α-bromostyrene, dichlorostyrene, dibromostyrene, tetrachlorostyrene, mixtures thereof, and the like. The preferred monovinylaromatic hydrocarbons used are sytrene and/or a α-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as ethyl acrylate and methyl methacrylate.

The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 60% by weight or less of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. In this case, the styrenes may comprise from about 30 to about 80% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyrene/acrylonitrile copolymer. Also, there are occasions where a copolymer, such as α-methylstyrene/acrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like, or it may also be an ethylene-propylene-diene backbone. Additionally, minor amounts of a diene may be copolymerized in the acrylate rubber backbone to yield improved grafting with the matrix polymer.

These resins are well known in the art and many are commercially available.

The process of preparing the copolymers of polyphenylene oxides and poly(aryl ether)s can be of two types:

(1) The monofunctional or difunctional hydroxyl terminated polyphenylene oxide is correacted in a typical poly(aryl ether) forming reaction. Thus, as described above, the poly(aryl ether)s can be prepared by the condensation of a dialkali metal salt of a diphenol with a dihalo or dinitro benzenoid compound bearing electron withdrawing groups. The reaction may be represented as follows:

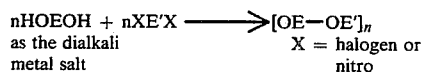

If in the above equation, part of the diphenol HOEOH is replaced with the polyphenylene oxide (I) or (II), the corresponding copolymers will result:

(Reaction I)

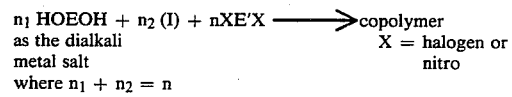

or (Reaction II)

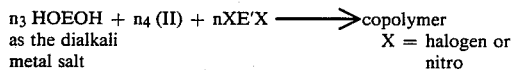

Here again, the number of reactive halogen atoms or nitro groups must be equal to the sum of hydroxyl groups that are reacted.

For Reaction (I) copolymers of the structure $(AB)_x$ are obtained wherein A is the polyphenylene oxide residue and B is the poly(aryl ether) residue. Reaction (II) yields copolymers AB and ABA wherein A and B are as defined above.

(2) A poly(aryl ether) oligomer is prepared with either a halogen (or nitro) or hydroxyl termination. Molecular weight control and termination of the oligomer are easily controlled by using a calculated excess of one of the reactants, i.e.,:

(Reaction III)

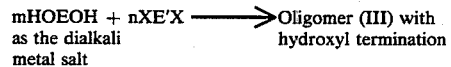

or (Reaction IV)

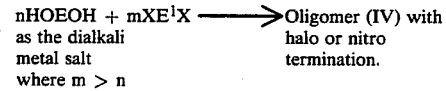

Oligomer (III) or (IV) can be then reacted with polyphenylene oxide (I) or (II) either directly or in the presence of XE'X as follows:

polyphenylene oxide (I) or (II) + Oligomer (IV)→copolymer polyphenylene oxide (I) or (II) + Oligomer (III) + XE'X→copolymer.

These reactions occur under typical poly(aryl ether) forming conditions as described above.

For the copolymers ABA and/or (AB)$_n$, the weight ratio of A to B can vary from 5:95 to 95:5. The preferred copolymer contains from 30 to 70 weight percent of A and from 70 to 30 weight percent of B. The preferred molecular weights of the block A are as described above and those of block B are generally in the same range.

The blends are compatible and possess excellent toughness. The preferred composition of the poly(aryl ether)-polyphenylene oxide-styrene polymer or copolymer blend contains from about 30 to about 70 weight percent of the styrene polymer or copolymer.

EXAMPLES

The following examples serve to give specific illustrations of the practice of this invention but they are not intended in any way to limit the scope of this invention.

EXAMPLE 1

Preparation of Poly(phenylene oxide) Oligomers

Using techniques described in the literature, as for example, in U.S. Pat. No. 4,355,661, Examples 1 and 2, the following mono- and difunctinal poly(phenylene oxide) oligomers are prepared:

A monofunctinal oligomer having a number average molecular weight of about 5500.

A difunctional oligomer having a number average molecular weight of about 8000.

EXAMPLE 2

In a 2 liter flask equipped with a stirrer, thermometer, a water cooled condenser and a Dean Stark moisture trap there are placed 11.40 grams (0.05 moles) of 2,2-bis(4-hydroxyphenyl)propane, 0.05 moles of the monofunctional polyphenylene oxide prepared in Example 1, possessing a molecular weight of about 5,500 and having the structure

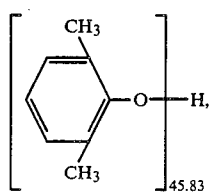

19.65 g of a 42.8% potassium hydroxide solution (0.15 moles KOH), 1000 ml of dimethylsulfoxide and 300 ml of chlorobenzene and the system is purged with nitrogen to maintain an inert atmosphere over the reaction mixture. The mixture is refluxed for 3 to 4 hours, continuously removing the water contained in the reaction mixture as an azeotrope with chlorobenzene and distilling off enough of the latter to give a refluxing mixture at 150°–160° C., consisting of the potassium salts of the 2,2-bis(4-hydroxyphenyl)propane, and the phenylene oxide oligomer, and dimethylsulfoxide essentially free of water. The mixture is cooled and 21.53 g (0.075 mole) of 4,4'-dichlorodiphenylsulfone is added followed by 100 ml of anhydrous dimethylsulfoxide, all under slight positive nitrogen pressure. The mixture is heated to reflux and held at reflux with good stirring for about 4–5 hours. The viscous, slightly orange solution is poured into 3000 ml water, rapidly circulating in a Waring blender, and the finely divided white polymer is filtered, washed twice with 3000 ml each of distilled water and then dried in a vacuum oven at 110° for 16 hours. A quantitative yield of a white polymer is obtained.

EXAMPLE 3

Using the procedure of Example 2 above a copolymer containing the difunctional polyphenylene oxide at a ratio of A to B of 40:60 is prepared.

EXAMPLES 4 TO 10

A series of blends containing the copolymers of Examples 2 and 3 is prepared using impact polystyrene and an ABS polymer. In all instances tough blends are obtained. As shown in the Table. For comparison blends 1 and 6 are made using a polysulfone having repeat units of the following formula:

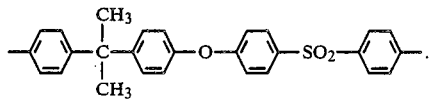

TABLE

| Example | Composition (wt %) | | Properties |
|---|---|---|---|
| 1 | Polysulfone-Polystyrene | (50:50) | Brittle |
| 2 | Copolymer of Ex. 2-Polystyrene | (30:70) | Ductile |
| 3 | Copolymer of Ex. 2-Polystyrene | (40:60) | Very Tough |
| 4 | Copolymer of Ex. 2-Polystyrene | (50:50) | Very Tough |
| 5 | Copolymer of Ex. 2-Polystyrene | (60:40) | Ductile |
| 6 | Polysulfone - ABS | (50:50) | Brittle |
| 7 | Copolymer of Ex. 3 - ABS | (30:70) | Ductile |
| 8 | Copolymer of Ex. 3 - ABS | (40:60) | Very Tough |
| 9 | Copolymer of Ex. 3 - ABS | (50:50) | Very Tough |
| 10 | Copolymer of Ex. 3 - ABS | (60:40) | Very Tough |

What is claimed is:

1. A copolymer comprising:
   (a) A polyphenylene oxide selected from the group consisting of the formula:

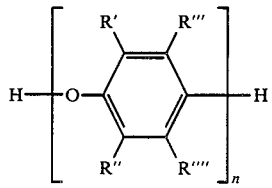

wherein n is at least equal to 10, R', R", R''', and R'''' are independently hydrogen, a hydrocarbon radical, a halohydrogen radical having at least 2 carbon atoms between the halogen atoms and phenol nucleus, a hydroxycarbonoxy radical, or a halohydrocarbonoxy radical having at least two carbon atoms between the halogen atoms and phenol nucleus,

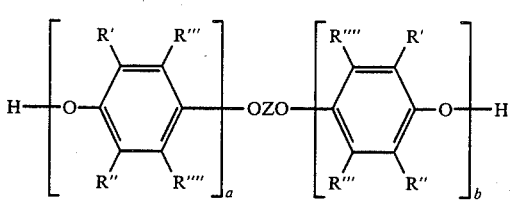

wherein independently each —OZO— is a divalent quinone residue, Z is a divalent arylene radical, a and b are at least equal to 1, the sum of the a and b is at least equal to 10, and R', R'', R''' and R'''' are as heretofore defined, and mixtures thereof and (b) a thermoplastic poly(aryl ether) having recurring units of the formula:

O—E—O—E' wherein E is the residuum of a dihydric phenol and E' is the residuum of a dihydric benzenoid compound having an inert electron withdrawing group in at least one of the positions ortho and para to the valence bonds, both of the residuum being valently bonded to the ether oxygens through aromatic carbon atoms.

2. A copolymer as defined in claim 1 wherein the poly(aryl ether) has repeating units of the following formula:

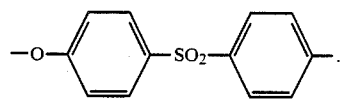

3. A copolymer as defined in claim 1 wherein the poly(aryl ether) has repeating units of the following formula:

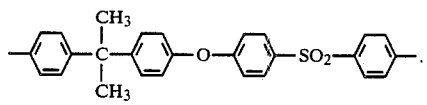

4. A copolymer as defined in claim 1 wherein the poly(aryl ether) has repeating units of the formula:

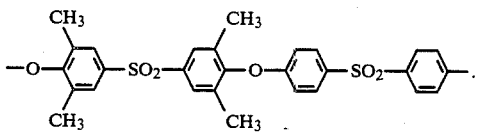

5. A copolymer as defined in claim 1 wherein the poly(aryl ether) has repeating units of the following formula:

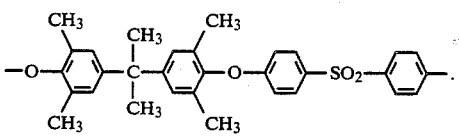

6. A copolymer as defined in claims 1 or 2 or 3 or 4 or 5 which is blended with a styrenic polymer.

7. A blend as defined in claim 6 wherein the styrenic polymer is polystyrene or impact modified polystyrene.

8. A blend as defined in claim 6 wherein the styrenic polymer is an ABS copolymer.

* * * * *